US 12,423,766 B2

(12) United States Patent
Honda (10) Patent No.: US 12,423,766 B2
(45) Date of Patent: Sep. 23, 2025

(54) VEHICLE INFORMATION MANAGEMENT DEVICE

(71) Applicant: TOYOTA JIDOSHA KABUSHIKI KAISHA, Toyota (JP)

(72) Inventor: Isao Honda, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 18/371,483

(22) Filed: Sep. 22, 2023

(65) Prior Publication Data

US 2024/0112291 A1 Apr. 4, 2024

(30) Foreign Application Priority Data

Oct. 4, 2022 (JP) ................. 2022-160548

(51) Int. Cl.
*B60W 40/00* (2006.01)
*B60W 40/06* (2012.01)
*B60W 60/00* (2020.01)
*G06Q 50/40* (2024.01)
*G06V 20/10* (2022.01)

(52) U.S. Cl.
CPC ............ *G06Q 50/40* (2024.01); *B60W 40/06* (2013.01); *B60W 60/00253* (2020.02); *G06V 20/182* (2022.01); *B60W 2540/041* (2020.02); *B60W 2552/25* (2020.02); *B60W 2556/45* (2020.02)

(58) Field of Classification Search
USPC ..................................... 701/23-28
See application file for complete search history.

(56) References Cited

U.S. PATENT DOCUMENTS

| | | | |
|---|---|---|---|
| 6,186,733 B1 * | 2/2001 | Lewis ................. | B60P 1/431 |
| | | | 414/921 |
| 10,286,904 B2 * | 5/2019 | Yaldo ................. | G08G 1/143 |
| 10,940,793 B1 * | 3/2021 | Damsaz ............. | E05B 77/08 |
| 11,015,937 B2 * | 5/2021 | Beaurepaire ....... | G01C 21/3685 |
| 11,084,456 B2 * | 8/2021 | Amacker ........... | G01M 17/0078 |
| 11,364,632 B2 * | 6/2022 | VanderSmitte ..... | B25J 9/1697 |
| 11,458,993 B2 * | 10/2022 | Brown ............... | G01C 21/3815 |
| 11,474,519 B2 * | 10/2022 | Hicok ................ | G01C 21/3415 |
| 11,613,196 B2 * | 3/2023 | Tomioka ............ | E05F 15/76 |
| | | | 414/537 |

(Continued)

FOREIGN PATENT DOCUMENTS

| CA | 3012008 C | * | 8/2023 | ............. A61G 3/061 |
|---|---|---|---|---|
| JP | H08-063697 A | | 3/1996 | |

(Continued)

*Primary Examiner* — Jonathan L Sample
(74) *Attorney, Agent, or Firm* — Dinsmore & Shohl LLP (57) ABSTRACT

A vehicle information management device includes: a processor, wherein the processor is configured to: before a vehicle arrives at a planned vehicle boarding area of a user, acquire road surface information of the planned vehicle boarding area; based on the road surface information, determine whether or not a road surface height of a planned vehicle boarding position, at which the user is waiting at the planned vehicle boarding area, is a height at which a ramp of the vehicle can be deployed; and in a case in which the road surface height is determined to not be a height at which the ramp can be deployed, propose a change of the planned vehicle boarding position to the user.

5 Claims, 5 Drawing Sheets

(56) References Cited

U.S. PATENT DOCUMENTS

| | | | | |
|---|---|---|---|---|
| 11,630,201 | B2* | 4/2023 | Koga | G01S 13/867 |
| | | | | 701/25 |
| 11,731,659 | B2* | 8/2023 | Hukkeri | G01C 21/3415 |
| | | | | 701/25 |
| 11,760,340 | B2* | 9/2023 | Golgiri | H04W 4/40 |
| | | | | 701/23 |
| 11,950,316 | B1* | 4/2024 | Nalevanko | H04W 4/40 |
| 12,134,930 | B2* | 11/2024 | Uchibori | E05F 15/76 |
| 12,257,194 | B1* | 3/2025 | Almeida | A61G 3/067 |
| 2015/0379468 | A1* | 12/2015 | Harvey | G05D 1/667 |
| | | | | 705/338 |
| 2019/0083334 | A1* | 3/2019 | MacPherson | B62D 31/02 |
| 2019/0193620 | A1* | 6/2019 | Matsuoka | B60K 7/0007 |
| 2020/0043344 | A1* | 2/2020 | Shimizu | G08G 1/096855 |
| 2020/0148108 | A1* | 5/2020 | Kumashiro | B60Q 9/008 |
| 2021/0070282 | A1* | 3/2021 | Kim | B60W 30/06 |
| 2021/0132604 | A1* | 5/2021 | Gillett | G05D 1/0016 |
| 2021/0155264 | A1* | 5/2021 | MacPherson | A61G 3/065 |
| 2021/0163042 | A1* | 6/2021 | van de Klashorst | |
| | | | | B60W 30/095 |
| 2021/0245649 | A1* | 8/2021 | Maeda | B60P 1/431 |
| 2021/0245783 | A1* | 8/2021 | Sakai | B60W 60/00253 |
| 2021/0310295 | A1* | 10/2021 | Uchibori | E05F 15/40 |
| 2021/0323574 | A1* | 10/2021 | Yoo | G01C 21/3407 |
| 2022/0126641 | A1* | 4/2022 | Oya | B60G 17/0195 |
| 2022/0135039 | A1* | 5/2022 | Jardine | B60W 30/18163 |
| | | | | 701/26 |
| 2022/0218541 | A1* | 7/2022 | Oya | A61G 3/065 |
| 2022/0332309 | A1* | 10/2022 | Ishida | B60W 40/08 |
| 2024/0142998 | A1* | 5/2024 | Donderici | B60W 60/00253 |

FOREIGN PATENT DOCUMENTS

| | | |
|---|---|---|
| JP | 2021-126956 A | 9/2021 |
| JP | 2022-068545 A | 5/2022 |
| WO | 2018/037954 A1 | 3/2018 |

* cited by examiner

VEHICLE INFORMATION MANAGEMENT DEVICE

CROSS-REFERENCE TO RELATED APPLICATION

This application is based on and claims priority under 35 USC 119 from Japanese Patent Application No. 2022-160548 filed on Oct. 4, 2022, the disclosure of which is incorporated by reference herein.

BACKGROUND

Technical Field

The present disclosure relates to a vehicle information management device.

Related Art

Japanese Patent Application Laid-Open (JP-A) No. 2021-126956 discloses a ramp system for a vehicle. The ramp system described in Japanese Patent Application Laid-Open (JP-A) No. 2021-126956 determines whether or not an obstacle is present at a ramp deployment area at which a ramp of a vehicle is deployed at a vehicle boarding location (a planned vehicle boarding area) such as a bus stop, and in a case in which it is determined that an obstacle is present at the ramp deployment area, moves the vehicle to a position at which the obstacle is not present.

However, in the vehicle ramp system described in Japanese Patent Application Laid-Open (JP-A) No. 2021-126956, an obstacle detection device that detects an obstacle is installed at the vehicle. Accordingly, the determination as to whether or not the ramp can be deployed at the vehicle boarding location is performed after the vehicle has arrived at the vehicle boarding location (the planned vehicle boarding area). Therefore, in a case in which an obstacle is present at a place where a user is waiting (a planned vehicle boarding position) and the vehicle cannot deploy the ramp, the user is forced to move to a place where the vehicle can deploy the ramp. As a result, time is required from the arrival of the vehicle at the vehicle boarding location (the planned vehicle boarding area) until the user boards the vehicle.

SUMMARY

The present disclosure provides a vehicle information management device that enables a user to smoothly board a vehicle after the vehicle has arrived at a planned vehicle boarding area.

A vehicle information management device according to first aspect includes: a road surface information acquisition section that is configured to acquire, before a vehicle arrives at a planned vehicle boarding area of a user, road surface information of the planned vehicle boarding area; a determination section that is configured to determine, based on the road surface information acquired by the road surface information acquisition section, whether or not a road surface height of a planned vehicle boarding position, at which the user is waiting, at the planned vehicle boarding area, is a height at which a ramp of the vehicle can be deployed; and a proposal section that is configured to propose, in a case in which the determination section determines that the road surface height is not a height at which the ramp can be deployed, a change of the planned vehicle boarding position to the user.

According to the vehicle information management device of the first aspect, road surface information of the planned vehicle boarding area is acquired by the road surface information acquisition section before the vehicle arrives at the planned vehicle boarding area of the user. Moreover, based on the road surface information that is acquired by the road surface information acquisition section, the determination section determines whether or not the road surface height of the planned vehicle boarding position, at which the user is waiting, at the planned vehicle boarding area, is a height at which the ramp of the vehicle can be deployed. This enables determination of whether or not the ramp can be deployed at the planned vehicle boarding position to be performed earlier than in a case of determination as to whether or not the ramp can be deployed at the planned vehicle boarding position after the vehicle has arrived at the planned vehicle boarding area. Note that the "planned vehicle boarding position" referred to herein is a concept that is narrower than the "planned vehicle boarding area", which is an area in which a user plans to board a vehicle, such as a stopping place, and refers to a position at which the user is actually waiting and at which a ramp from the vehicle is envisaged as being deployed.

Moreover, in a case in which the determination section determines that the road surface height of the planned vehicle boarding position is not a height at which the ramp can be deployed, the proposal section proposes to the user to change the planned vehicle boarding position. This enables the user to know that the planned vehicle boarding position that he or she is currently waiting at is a position at which the ramp cannot be deployed, enabling the user to move before the vehicle arrives or immediately after the vehicle arrives.

A vehicle information management device according a second aspect is the vehicle information management device according to the first aspect, wherein the determination section is configured to: determine, based on the road surface information, whether or not an obstacle is present which will obstruct deployment of the ramp at the planned vehicle boarding position; in a case in which an obstacle is not present and the road surface height is a height at which the ramp can be deployed, determine that the ramp can be deployed at the planned vehicle boarding position; and in at least one of a case in which an obstacle is present or a case in which the road surface height is not a height at which the ramp can be deployed, determine that the ramp cannot be deployed at the planned vehicle boarding position.

According to the vehicle information management device of the second aspect, based on the road surface information, the determination section further determines whether or not an obstacle is present which will obstruct deployment of the ramp at the planned vehicle boarding position. In a case in which an obstacle is not present and the road surface height is a height at which the ramp can be deployed, it is determined that the ramp can be deployed at the planned vehicle boarding position. On the other hand, in at least one of a case in which an obstacle is present or a case in which the road surface height is not at a height at which the ramp can be deployed, it is determined that the ramp cannot be deployed at the planned vehicle boarding position. In a case in which an obstacle is detected after the vehicle has arrived at the planned vehicle boarding area, or in a case in which the vehicle has arrived at the planned vehicle boarding area and then deploys the ramp before it is determined that the ramp cannot be deployed due to an obstacle, the vehicle and the user are forced to move. In contrast, the vehicle information management device of the second aspect enables an early determination as to whether or not it is possible to deploy the ramp, before the vehicle arrives at the planned vehicle boarding area.

A vehicle information management device according a third aspect is the vehicle information management device according to the second aspect, wherein the road surface information acquisition section is configured to acquire the road surface information from a detection device provided at the planned vehicle boarding area.

According to the vehicle information management device of the third aspect, the road surface information is acquired from the detection device that is provided at the planned vehicle boarding area. For example, in a case in which the detection device is provided at a planned vehicle boarding area such as a stopping place, the road surface information is acquired from this detection device. This enables the road surface information to be automatically acquired from the planned vehicle boarding area, for example, without the user intentionally capturing an image of the planned vehicle boarding area while waiting for the vehicle.

A vehicle information management device according a fourth aspect is the vehicle information management device according to the second aspect, wherein the road surface information acquisition section is configured to acquire the road surface information from a terminal carried by the user.

According to the vehicle information management device of the fourth aspect, the road surface information is acquired from the terminal that is carried by the user. This enables the road surface information of the planned vehicle boarding area to be acquired from the terminal carried by the user even in a case in which, for example, the detection device is not provided at the planned vehicle boarding area that is designated in advance by the user.

A vehicle information management device according to a fifth aspect includes: a road surface information acquisition section that is configured to acquire, before a vehicle arrives at a planned vehicle boarding area of a user, road surface information of the planned vehicle boarding area; a determination section that is configured to determine, based on the road surface information acquired by the road surface information acquisition section, whether or not an obstacle is present which will be an obstruction to opening a door of the vehicle, at a planned vehicle boarding position at which the user is waiting at the planned vehicle boarding area; a notification section that is configured to notify, in a case in which the determination section determines that an obstacle is present, the user that a vehicle boarding entrance is narrow; and a control section that is configured to, in a case in which the determination section determines that an obstacle is present, change an opening amount of the door.

According to the vehicle information management device of the fifth aspect, road surface information of the planned vehicle boarding area is acquired by the road surface information acquisition section before the vehicle arrives at the planned vehicle boarding area of the user. Moreover, based on the road surface information that is acquired by the road surface information acquisition section, the determination section determines whether or not an obstacle is present which will be an obstruction to opening a door of the vehicle, at the planned vehicle boarding position at which the user is waiting at the planned vehicle boarding area. This enables early determination of whether or not the door can be opened, as compared to a case in which determination is made after the vehicle has arrived at the planned vehicle boarding area as to whether or not the door can be opened.

Further, in a case in which it is determined that an obstacle is present, the notification section notifies the user that the vehicle boarding entrance is narrow. This enables the user to determine, before the vehicle arrives, whether or not the current waiting location is appropriate based on the opening amount of the door.

Moreover, in a case in which it is determined that an obstacle is present, the control section changes the opening amount of the door. This enables a situation in which the door hits an obstacle after the vehicle has arrived at the planned vehicle boarding area to be avoided.

The vehicle information management device according to the first aspect has an effect of enabling the user to smoothly board the vehicle after the vehicle has arrived at the planned vehicle boarding area.

The vehicle information management device according to the second aspect has an effect of enabling the user to board the vehicle more smoothly after the vehicle has arrived at the planned vehicle boarding area.

The vehicle information management device according to the third aspect has an effect of enabling the road surface information to be acquired without requiring time and effort by the user.

The vehicle information management device according to the fourth aspect has an effect of enabling the road surface information to be acquired even in a case in which a detection device is not installed at the planned vehicle boarding area.

The vehicle information management device according to the fifth aspect has an effect of enabling the user to smoothly board the vehicle after the vehicle has arrived at the planned vehicle boarding area.

BRIEF DESCRIPTION OF THE DRAWINGS

An exemplary embodiment of the present disclosure will be described in detail based on the following figures, wherein.

DETAILED DESCRIPTION

Explanation follows regarding a vehicle information management system S including a vehicle V that is installed with an onboard unit 10 serving as a vehicle information management device according to an exemplary embodiment of the present disclosure, with reference to FIG. 1 to FIG. 5. Note that the arrow UP illustrated in FIG. 1 indicates an upper side in a vehicle vertical direction, the arrow FR illustrated in FIG. 1 indicates a front side in a vehicle front-rear direction, and the arrow RH indicates a right side in a vehicle width direction (left-right direction). Further, in the following explanation, in cases in which the up-down, front-rear, or left-right directions are used without special mention, these indicate up-down in the vehicle vertical direction, front-rear in the vehicle vertical direction, or left-right when the vehicle is oriented in the travel direction, respectively.

Overall System Configuration

Figure 1:
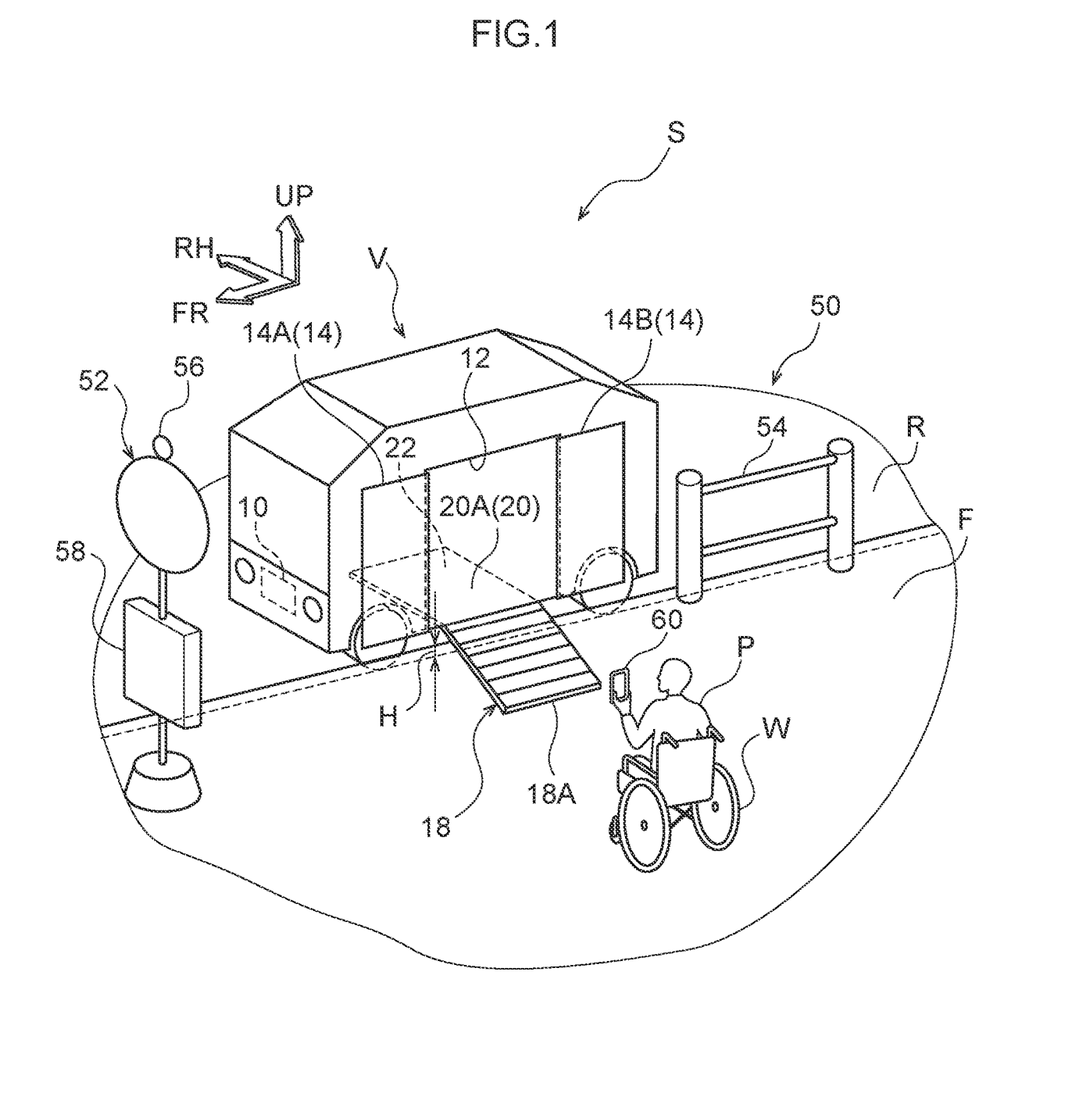
FIG. 1 is a diagram illustrating a schematic configuration of a vehicle information management system including a vehicle that includes an onboard unit serving as a vehicle information management device according to the present exemplary embodiment.

As illustrated in FIG. 1, the vehicle information management system S of the present exemplary embodiment includes a vehicle V, a sign post 52 provided at a stopping place 50 that serves as a planned vehicle boarding area at which a user P is waiting to board the vehicle V, and a terminal 60 carried by the user P. The terminal 60 is a smartphone or the like and is configured to have image capture functionality and communication functionality. As an example, the user P is a person who is in a wheelchair W. Note that the user is not limited to a wheelchair user.

The onboard unit 10, the terminal 60, and a control device 58 are connected via a network (not illustrated) so as to be capable of communicating with each other. The onboard devices of plural vehicles, the terminals of plural users, and the control devices of plural stopping places are connected to the network.

Configuration of the Stopping Place 50

As an example, a sign post 52 displaying the name, time table, route map, and the like of the stopping place 50 is placed at the stopping place 50. Note that the stopping place is not limited to one that includes the sign post 52 illustrated in FIG. 1, and may include, for example, a roof or a wall. Further, the planned vehicle boarding area is not limited to the stopping place 50 that includes predetermined signs such as the sign post 52 and at which the vehicle V stops repeatedly, and may be a location designated by the user P on a dispatch application of the terminal 60, for example.

A guard pipe 54 is provided at the stopping place 50. In the present exemplary embodiment, explanation follows assuming that in a case in which the user P is waiting for the vehicle V in front of the guard pipe 54, the guard pipe 54 corresponds to an obstacle in the present disclosure.

At the stopping place 50, there is a height difference H, which serves as a road surface height, between the sidewalk F at which the user P waits and the roadway R along which the vehicle V travels. More specifically, the sidewalk F is provided at a position higher than the roadway R by the height difference H. Note that the planned vehicle boarding area is not limited to a road that can be distinguished from the sidewalk F and the roadway R, and may be, for example, a parking lot without steps.

The sign post 52 includes a camera 56 serving as a detection device that acquires road surface information for the stopping place 50. As an example, the camera 56 is configured to be capable of capturing an image of a predetermined road surface area (the shaded portion illustrated in FIG. 1) including the sidewalk F and the roadway R at the stopping place 50. Note that the detection device is not limited to the camera 56, and other devices such as a millimeter-wave radar that transmits scanning waves over a predetermined range and receives reflected waves, a laser imaging detection and ranging (LIDAR) sensor that scans a predetermined range, or an ultrasonic sensor may be used, or these devices may be used in combination.

The sign post 52 further includes the control device 58 that transmits road surface information to the onboard unit 10 of the vehicle V. The control device 58 records the height difference H between the sidewalk F and the roadway R at the stopping place 50 as registration information, and transmits this information to the onboard unit 10 as road surface information, together with the image captured by the camera 56.

Hardware Configuration of the Vehicle V

The vehicle V provided with the onboard unit 10 is, for example, an electric bus that travels by automatic operation, and is also capable of travelling by remote operation. Note that the vehicle may be a vehicle that travels by manual driving.

As illustrated in FIG. 1, a substantially rectangular opening 12 is formed at a left side portion of the vehicle V. The opening 12 can be opened and closed by a pair of sliding doors 14 that slide along the vehicle front-rear direction. The vehicle V further includes a ramp 18 having a substantially rectangular plate shape that moves outward from the opening 12 in the vehicle width direction and deploys outward of the vehicle V.

FIG. 1 illustrates the vehicle V in a state in which each of the pair of sliding doors 14 is fully opened and the ramp 18 is deployed. In an open state, a front-side sliding door 14A is disposed outside the left side portion of the vehicle V in the vehicle width direction at a front side in the vehicle front-rear direction of the opening 12. In an open state, a rear-side sliding door 14B is disposed outside the left side portion of the vehicle V in the vehicle width direction at a rear side in the vehicle front-rear direction of the opening 12. Hereinafter, a region through which the sliding doors 14 pass from a state in which the pair of sliding doors 14 are closed to a fully open state as illustrated in FIG. 1 after the vehicle V has arrived at the stopping place 50 is referred to as a "planned door deployment region". Each of the pair of sliding doors 14 is opened and closed by a door opening and closing mechanism 28B (see FIG. 2).

Moreover, a floor surface 20A of the floor portion 20 of the vehicle V is entirely flat, and a storage portion 22 configured to be capable of storing the ramp 18 is provided below the floor portion 20. The ramp 18 is deployed and stored by a ramp deployment and storage mechanism 28A (see FIG. 2), including a drive motor (not illustrated). The ramp 18 is formed shorter than the width dimension of the opening 12.

When the drive motor (not illustrated) is driven in a state in which the ramp 18 is stored in the storage portion 22, the ramp 18 is moved outward in the vehicle width direction by the ramp deployment and storage mechanism 28A (see FIG. 2) and deployed outward of the vehicle. A rear end portion of the ramp 18 in a deployment direction is provided with a shaft portion (not illustrated) having a line extending in the vehicle front-rear direction as an axis. When the ramp 18 is extended from the storage portion 22, a distal end 18A of the ramp 18 is rotatable downward about the shaft portion. Namely, in a case in which there is a height difference between the floor surface 20A of the floor portion 20 of the vehicle V and the sidewalk F, the ramp 18 tilts downward as it moves toward the sidewalk F in a deployed state. Hereinafter, a region through which the ramp 18 passes from a state in which the ramp 18 is stored to a deployed state as illustrated in FIG. 1 after the vehicle V has arrived at the stopping place 50 is referred to as a "planned ramp deployment region".

On the other hand, when the drive motor (not illustrated) is driven in a state in which the ramp 18 is deployed, the ramp 18 moves toward the vehicle V, and is stored in the storage portion 22. Note that the ramp may be configured by one plate or plural plates.

Figure 2:
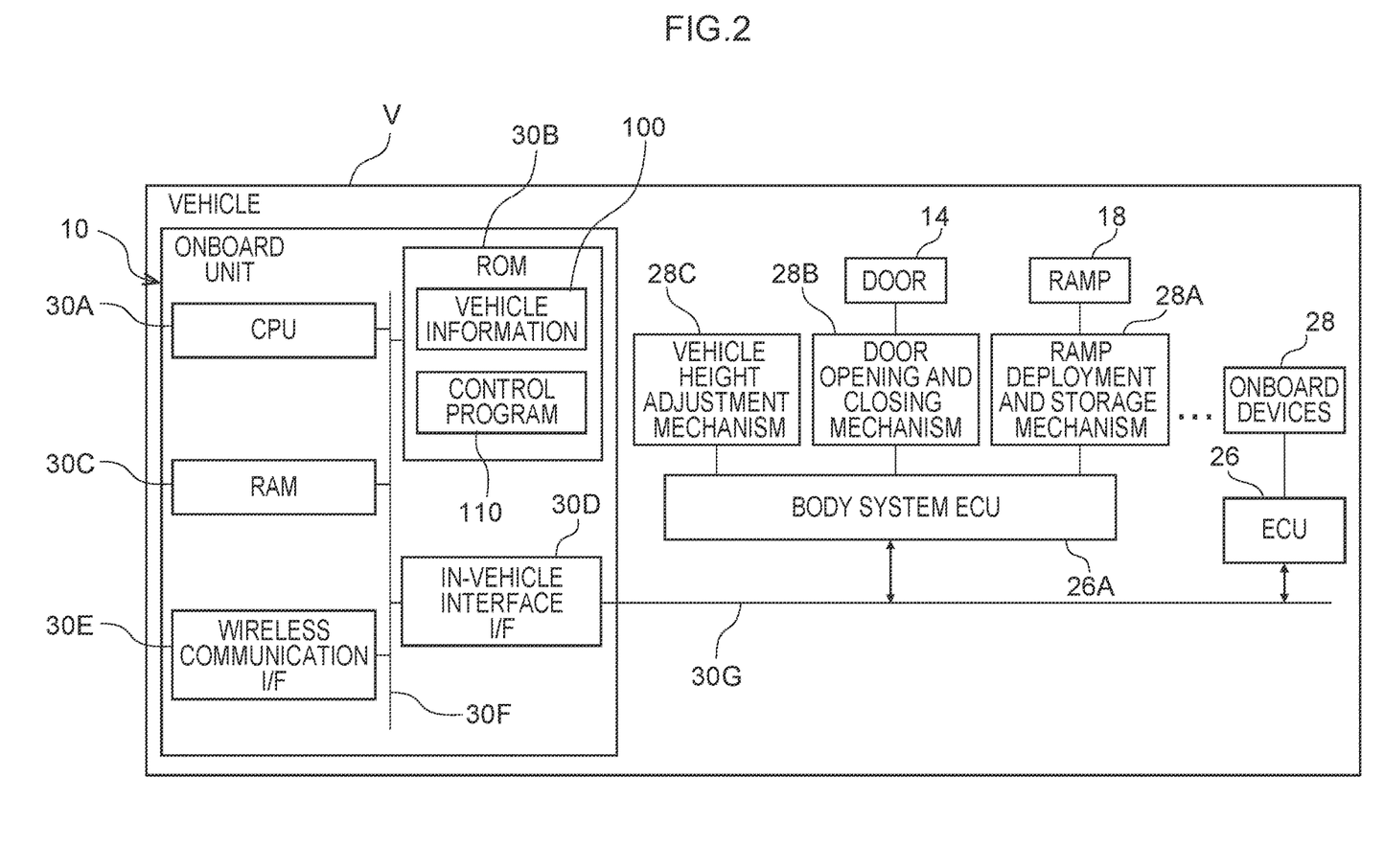
FIG. 2 is a block diagram illustrating a hardware configuration of the vehicle illustrated in FIG. 1.

As illustrated in FIG. 2, the vehicle V includes the onboard unit 10, plural electronic control units (ECUs) 26, and plural onboard devices 28.

The onboard unit 10 includes a central processing unit (CPU; serving as a processor) 30A, read only memory (ROM) 30B, random access memory (RAM) 30C, an in-vehicle communication interface (I/F) 30D, and a wireless communication I/F 30E. The CPU 30A, the ROM 30B, the RAM 30C, the in-vehicle communication I/F 30D, and the wireless communication I/F 30E are connected so as to be capable of communicating with each other via an internal bus 30F.

The CPU 30A is a central processing unit that executes various programs and controls various components. Namely, the CPU 30A reads a program from the ROM 30B, and executes the program using the RAM 30C as a workspace. The CPU 30A controls the respective configurations described above and performs a variety of computation processing in accordance with programs stored in the ROM 30B.

The ROM 30B stores various programs and various data. Vehicle information 100 and a control program 110 that controls the vehicle V are stored in the ROM 30B. The vehicle information 100 is information including information relating to the width of the opening 12, and information relating to a relative position of the planned ramp deployment region and a relative position of the planned door deployment region with respect to the vehicle V.

The RAM 30C serves as a workspace to temporarily store programs and data.

The in-vehicle communication I/F 30D is an interface for connecting to the respective ECUs 26. The in-vehicle communication I/F 30D employs a communication protocol based on the CAN protocol. The in-vehicle communication I/F 30D is connected to an external bus 30G.

The wireless communication I/F 30E is connected to a network (not illustrated), and is a wireless communication module for communicating with the control device 58 of the stopping place 50 and the terminal 60 of the user P. The wireless communication I/F 30E uses a communication protocol such as 5G, LTE, or Wi-Fi (registered trademark).

The ECU 26 includes a body system ECU 26A. The body system ECU 26A performs overall control of the ramp deployment and storage mechanism 28A, the door opening and closing mechanism 28B, and a vehicle height adjustment mechanism 28C. The vehicle height adjustment mechanism 28C includes a suspension (not illustrated) and is configured so as to be able to change heights of the floor surface 20A with respect to the roadway R and the sidewalk F. Namely, the vehicle V can adjust the vehicle height using the vehicle height adjustment mechanism 28C. This enables the vehicle V to deploy the ramp 18 at the sidewalk F as long as the height of the road surface is within a predetermined range.

Functional Configuration of the Onboard Unit 10

Figure 3:
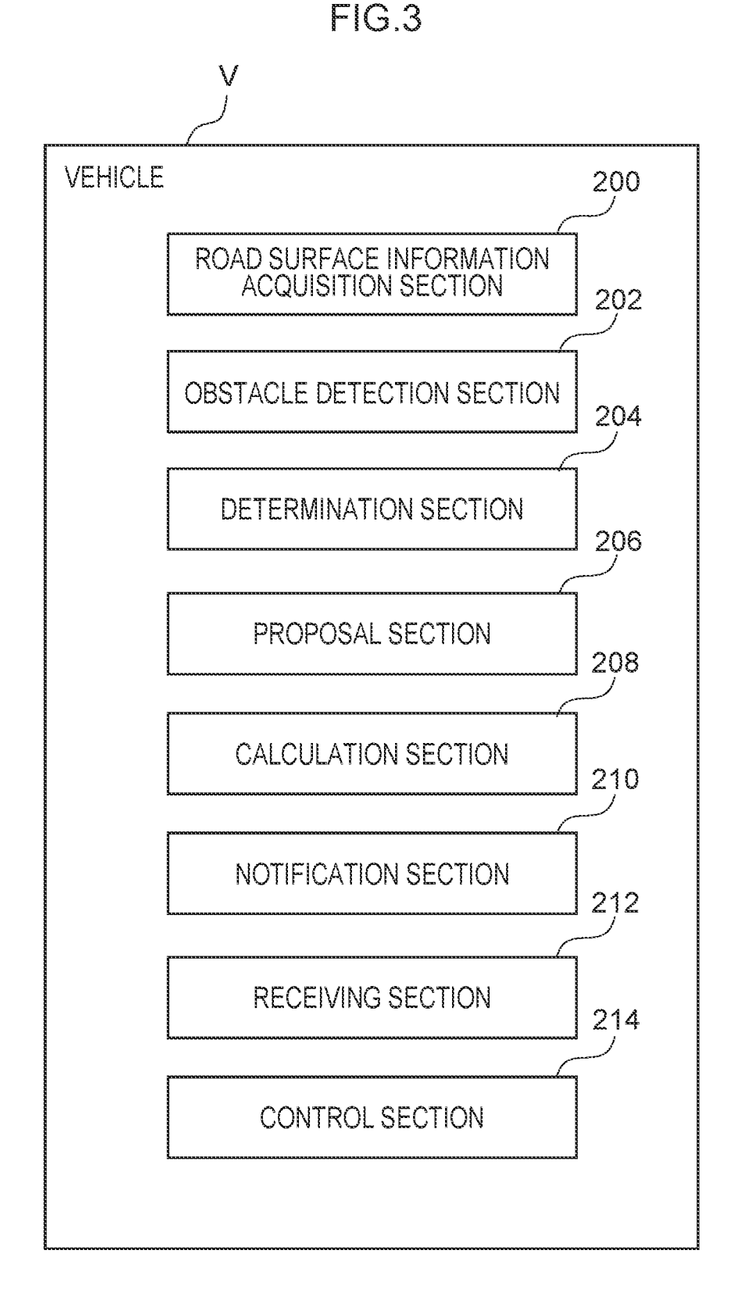
FIG. 3 is a block diagram illustrating a functional configuration of the onboard unit illustrated in FIG. 2.

As illustrated in FIG. 3, the onboard unit 10 functions as a road surface information acquisition section 200, an obstacle detection section 202, a determination section 204, a proposal section 206, a calculation section 208, a notification section 210, a receiving section 212, and a control section 214 by the CPU 30A executing the control program 110.

The road surface information acquisition section 200 has a function of acquiring road surface information of the stopping place 50 while the vehicle V is traveling along a route to the stopping place 50. The road surface information acquisition section 200 acquires road surface information from at least one of the control device 58 provided at the sign post 52 of the stopping place 50 or the terminal 60 carried by the user P. The timing at which the road surface information acquisition section 200 acquires road surface information is, for example, one minute prior to a scheduled arrival time at which the vehicle V arrives at the planned vehicle boarding area, but is not limited thereto. For example, the onboard unit 10 may acquire the road surface information as needed at predetermined time intervals until before the vehicle V arrives at the stopping place 50 after receiving vehicle boarding preference information from the terminal 60 of the user P. Moreover, the road surface information acquisition section 200 acquires information relating to the dimension of the user P in the width direction, together with road surface information. For example, as illustrated in FIG. 1, in a case in which the user P is in the wheelchair W, the dimension in the width direction of the wheelchair W is acquired.

The obstacle detection section 202 has a function of detecting obstacles that may be present in the planned ramp deployment region or the planned door deployment region in a case in which the vehicle V has arrived at the stopping place 50, namely, obstacles that may interfere with the deployed ramp 18 or the pair of sliding doors 14.

The determination section 204 has a function of determining whether or not the ramp 18 is required when the user P gets on or off the vehicle V, based on the vehicle boarding preference information received by the receiving section 212, which is described below.

Moreover, the determination section 204 has a function of determining, based on the road surface information acquired by the road surface information acquisition section 200, whether or not an obstacle is present which will obstruct deployment of the ramp 18 of the vehicle V, at the planned vehicle boarding position at which the user P is waiting at the stopping place 50.

Further, based on the road surface information, the determination section 204 has a function of determining whether or not the road surface height of the planned vehicle boarding position is a height at which the ramp 18 of the vehicle V can be deployed. Note that whether or not the road surface height is a height at which the ramp 18 can be deployed is determined in consideration of the vehicle height adjustment performed by the vehicle height adjustment mechanism 28C and the adjustment performed by rotating the distal end 18A of the ramp 18 downward about the shaft portion (not illustrated).

The determination section 204 determines that the ramp 18 can be deployed at the planned vehicle boarding position in a case in which an obstacle which will obstruct deployment of the ramp 18 is not present at the planned vehicle boarding position and the road surface height is a height at which the ramp 18 can be deployed. On the other hand, in at least one of a case in which an obstacle which will obstruct deployment of the ramp 18 is present at the planned vehicle boarding position or a case in which the road surface height is not a height at which the ramp 18 can be deployed, the determination section 204 determines that the ramp 18 cannot be deployed at the planned vehicle boarding position.

As an example, in a case in which the user P is waiting for the vehicle V in front of the guard pipe 54 (on the sidewalk side), namely, in a case in which the position at which the guard pipe 54 is present is set as the planned vehicle boarding position, the determination section 204 determines that the ramp 18 cannot be deployed at the planned vehicle boarding position. On the other hand, as illustrated in FIG. 1, in a case in which an obstacle is not present at the planned vehicle boarding position at which the user P is waiting, and the height difference H between the roadway R and the sidewalk F is a height at which the ramp 18 can be deployed, the determination section 204 determines that the ramp 18 can be deployed at the planned vehicle boarding position.

Moreover, based on the road surface information, the determination section 204 has a function of determining whether or not an obstacle which will be an obstruction to opening the pair of sliding doors 14 is present at the planned vehicle boarding position.

As an example, in a case in which the user P is waiting for the vehicle V in front of the guard pipe 54 (on the sidewalk side), and in a case in which it is predicted that the sliding doors 14 will interfere with the guard pipe 54 during deployment, the determination section 204 determines that the pair of sliding doors 14 cannot be fully opened at the planned vehicle boarding position. On the other hand, as illustrated in FIG. 1, in a case in which an obstacle is not present at the planned door deployment region at which the pair of sliding doors 14 are deployed, the determination section 204 determines that the pair of sliding doors 14 can be fully opened.

Moreover, in a case in which an obstacle is present which will be an obstruction to opening the pair of sliding doors 14, the determination section 204 has a function of determining whether or not the pair of sliding doors 14 is opened to a width at which the user P can board or more, based on information relating to the dimension in the width direction of the user P.

The determination section 204 has a function of determining whether or not the user P wishes to move location in a case in which the determination section 204 determines that the pair of sliding doors 14 will open to a width that is equal to or greater than a width at which the user P can board. As an example, the determination section 204 determines whether or not the user P has pressed a button on the terminal 60 to the effect that the user P wishes to move location. On the other hand, in a case in which the user P has pressed a button on the terminal 60 to the effect that he or she does not wish to move location, or in a case in which the application is ended without selecting a button, the determination section 204 determines that the user P did not wish to move location.

Moreover, the determination section 204 has a function of determining whether or not the user P has agreed to move to a location proposed by the proposal section 206, which is described below. As an example, the determination section 204 determines whether or not the user P has pressed a button on the terminal 60 to agree to move location. In a case in which the user P has pressed a button on the terminal 60 to the effect that the user P does not agree to move location or in a case in which the application is ended without selecting a button, the determination section 204 determines that the user P did not agree to move location.

In a case in which the determination section 204 determines that the ramp 18 cannot be deployed at the planned vehicle boarding position, the proposal section 206 has a function of proposing a change in the planned vehicle boarding position to the user P. Moreover, the proposal section 206 has a function of proposing a change in the planned vehicle boarding position to the user P in a case in which the determination section 204 determines that the pair of sliding doors 14 will not open to a width that enables the user P to board, due to an obstacle.

The calculation section 208 has a function of calculating a recommended area to which to move, which serves as a candidate for a new planned vehicle boarding position, in a case in which the user P has agreed to move to a location proposed by the proposal section 206 and in a case in which the user P receives a notification from the notification section 210 that the vehicle boarding entrance is narrow and wishes to move location. Note that the recommended area to which to move is an area that is located at a position at which the ramp 18 can be deployed and the pair of sliding doors 14 can be fully opened, namely, a road surface height at which there are no obstacles that may interfere with the planned ramp deployment region or the planned door deployment region, and at which the ramp can be deployed, based on the road surface information.

In a case in which the determination section 204 determines that the pair of sliding doors 14, despite there being an obstacle, will open to a width at which the user P can board the vehicle or greater, the notification section 210 has a function of notifying the terminal 60 of the user P that the vehicle boarding entrance is narrower than usual. Note that the term "usual" as used herein refers to a state in which both of the pair of sliding doors 14 are fully opened. Moreover, the notification section 210 has a function of transmitting a notification to the terminal 60 to inquire whether or not the user P wishes to move location, namely, change the planned vehicle boarding position, after or simultaneously with the notification to the terminal 60 of the user P to the effect that the vehicle boarding entrance is narrower than usual. Moreover, the notification section 210 has a function of notifying the terminal 60 of the user P of the recommended area to which to move, which is determined by the calculation section 208.

The receiving section 212 has a function of receiving vehicle boarding preference information from the terminal 60 of the user P. For example, when the user P calls the vehicle V, if to the effect that "barrier-free preference" is inputted at the terminal 60, the vehicle boarding preference information is received by the receiving section 212. Moreover, the receiving section 212 has a function of receiving change preference information for the planned vehicle boarding position from the terminal 60 of the user P.

The control section 214 has a function of controlling the onboard devices 28, including the ramp deployment and storage mechanism 28A, the door opening and closing mechanism 28B, and the vehicle height adjustment mechanism 28C, based on the control program 110. Moreover, in a case in which the determination section 204 determines that even though an obstacle is present at the planned door deployment region and the vehicle boarding entrance is narrow, movement preference information has not been received, the control section 214 has a function of changing the door opening amount of the control program 110.

Operation of the Present Exemplary Embodiment

Figure 4:
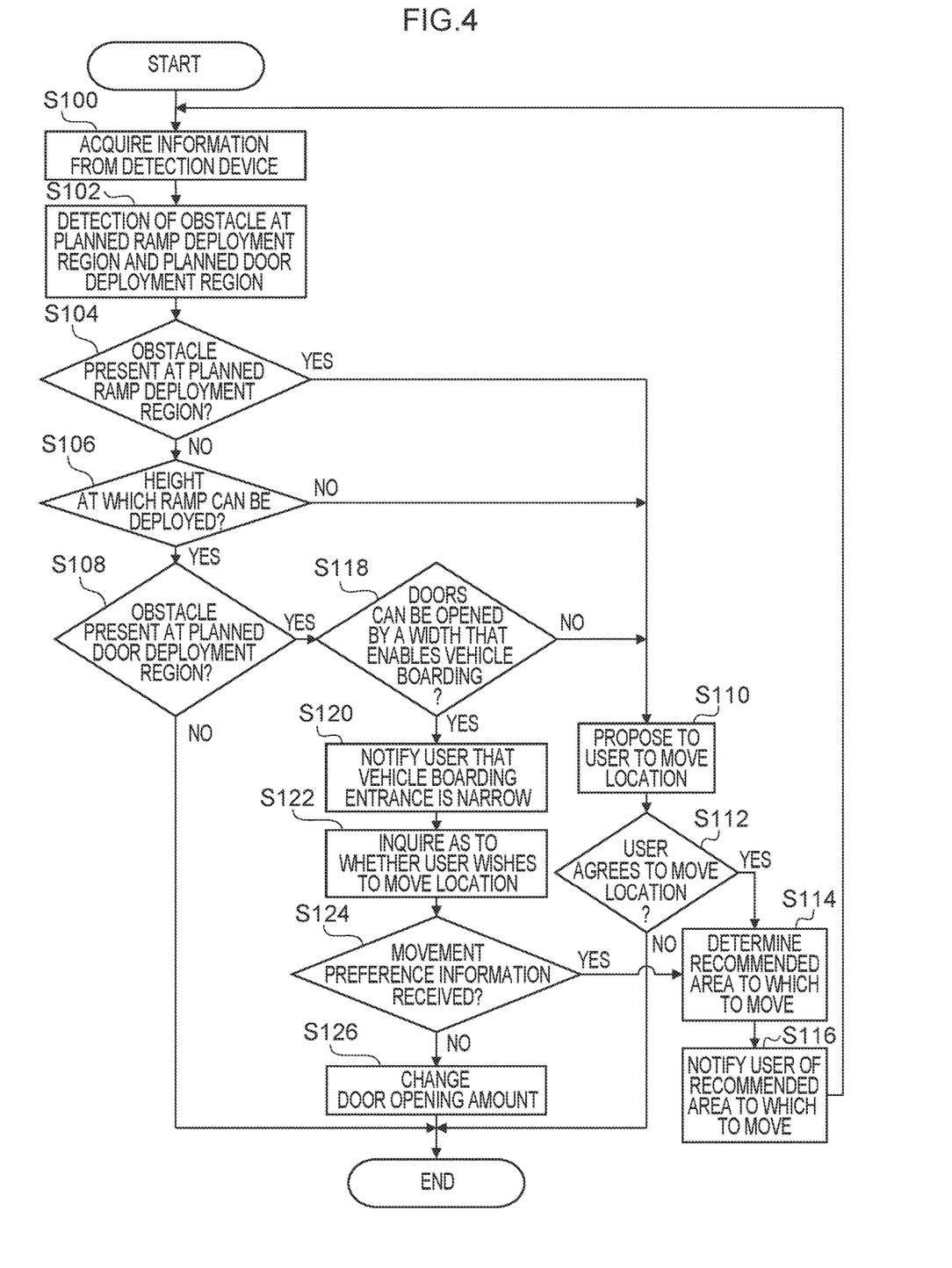
FIG. 4 is a flowchart illustrating a flow of processing performed by the onboard unit before the vehicle illustrated in FIG. 1 arrives at a stopping place.
Figure 5:
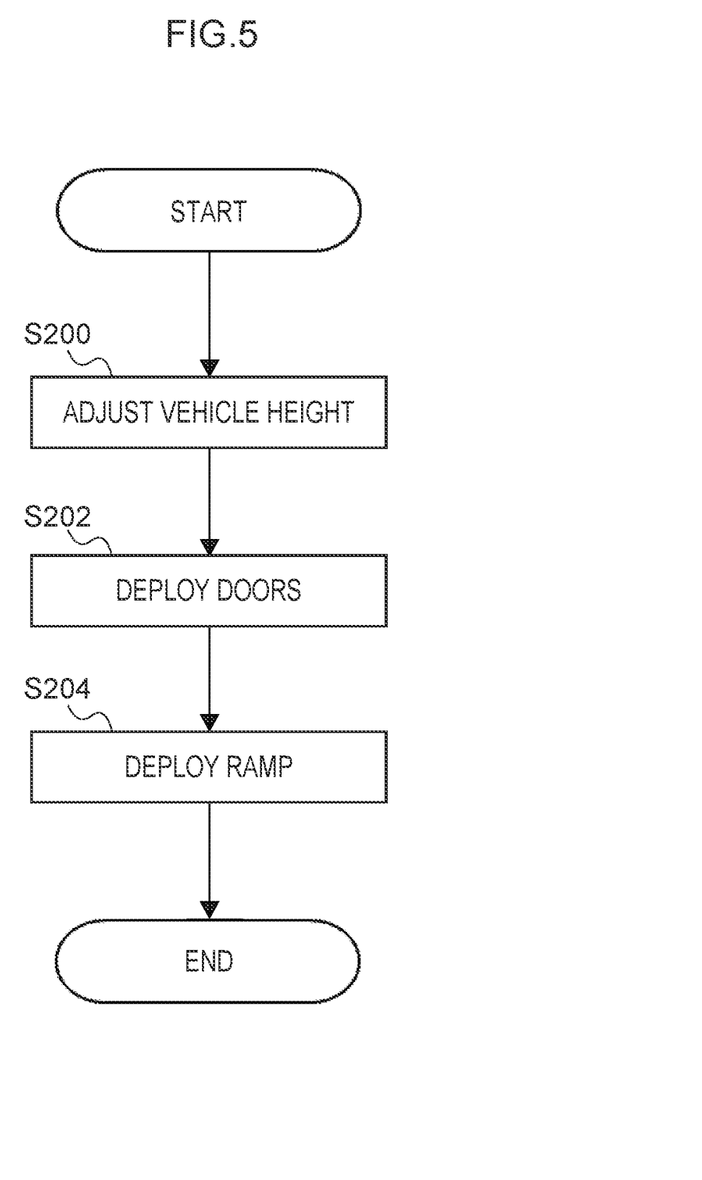
FIG. 5 is a flowchart illustrating a flow of processing performed by the onboard unit after the vehicle illustrated in FIG. 1 has arrived at the stopping place.

Next, explanation follows regarding a flow of processing executed by the onboard unit 10, with reference to the flowcharts illustrated in FIG. 4 and FIG. 5, and explanation follows regarding operation of the present exemplary embodiment. FIG. 4 illustrates a flow of processing performed by the onboard unit 10 after the onboard unit 10 receives vehicle boarding preference information from the terminal 60 of the user P and before the vehicle V arrives at the stopping place 50.

At step S100, the CPU 30A of the onboard unit 10 acquires road surface information from the control device 58 of the stopping place 50 and the terminal 60 of the user P.

Next, at step S102, based on the road surface information, the CPU 30A detects obstacles in the planned ramp deployment region and the planned door deployment region.

Then, at step S104, the CPU 30A determines whether or not an obstacle is present in the planned ramp deployment region.

In a case in which the CPU 30A determines at step S104 that an obstacle is not present at the planned ramp deployment region, at step S106, the CPU 30A determines whether or not the road surface height of the sidewalk F, including the planned vehicle boarding position at which the user P is waiting, is a height at which the ramp 18 can be deployed.

In a case in which the CPU 30A determines at step S106 that the road surface height of the planned vehicle boarding position is a height at which the ramp 18 can be deployed, at step S108, the CPU 30A determines whether or not an obstacle is present at the planned door deployment region.

In a case in which the CPU 30A determines at step S108 that an obstacle is not present at the planned door deployment region, the processing before the vehicle V arrives at the stopping place 50 is ended.

On the other hand, in a case in which the CPU 30A determines at step S104 that an obstacle is present at the planned ramp deployment region, the CPU 30A determines that the ramp 18 cannot be deployed at the planned vehicle boarding position, and proposes to the user P to move location, that is, change the planned vehicle boarding position, at step S110.

Next, at step S112, the CPU 30A determines whether or not the user P has agreed to move location.

In a case in which the CPU 30A determines at step S112 that the user has agreed to move location, at step S114, the CPU 30A determines a recommended area to which to move.

At step S116, the CPU 30A notifies the user P of the recommended area to which to move that is determined at step S114, and executes the processing from step S100 onward again.

On the other hand, in a case in which the CPU 30A determines at step S112 that the user P does not agree to move location, the processing before the vehicle V arrives at the stopping place 50 is ended.

Moreover, in a case in which the CPU 30A determines at step S106 that the road surface height of the planned vehicle boarding position is not a height at which the ramp 18 can be deployed, the CPU 30A determines that the ramp 18 cannot be deployed at the planned vehicle boarding position, and executes the processing at step S110 and subsequent steps.

Further, in a case in which the CPU 30A determines at step S108 that an obstacle is present at the planned door deployment region, at step S118, the CPU 30A determines whether or not the pair of sliding doors 14 can be opened by a width that enables the user P to board the vehicle.

In a case in which the CPU 30A determines at step S118 that the pair of sliding doors 14 cannot be opened by a width that enables the user P to board the vehicle, the processing at step S110 and subsequent steps is executed.

On the other hand, in a case in which the CPU 30A determines at step S118 that the pair of sliding doors 14 can be opened by a width that enables the user P to board the vehicle, at step S120, the CPU 30A notifies the user P that the vehicle boarding entrance is narrow.

Next, at step S122, the CPU 30A inquires as to whether or not the user P wishes to move location, in consideration of the fact that the vehicle boarding entrance is narrow. This enables the user P to determine before the vehicle arrives as to whether or not the current waiting location is appropriate based on the opening amount of the doors.

Then, at step S124, the CPU 30A determines whether or not the user P has pressed a button on the terminal 60 to the effect that the user P wishes to move, namely, whether or not the movement preference information has been received.

In a case in which the CPU 30A determines that the movement preference information has not been received at step S124, the CPU 30A changes the door opening amount of the control program 110 at step S126, and ends the processing before the vehicle V arrives at the stopping place 50. The door opening amount is set as an amount by which each of the pair of sliding doors 14 opens to a maximum extent within a range in which the sliding doors 14 do not interfere with an obstacle. This enables a situation in which the pair of sliding doors 14 interfere with an obstacle after the vehicle V has arrived at the stopping place 50 to be avoided.

FIG. 5 illustrates a flow of processing performed by the onboard unit 10 after the vehicle V has arrived at the stopping place 50. At step S200, the CPU 30A adjusts the vehicle height in accordance with the road surface height so as to enable the ramp 18 to be deployed at the planned vehicle boarding position. Next, at step S202, the CPU 30A opens the pair of sliding doors 14. Further, at step S204, the CPU 30A deploys the ramp 18 and ends the processing. Note that the processing performed after the vehicle V has arrived at the stopping place 50 is not limited to that which is described above, and for example, vehicle height adjustment and door deployment may be performed simultaneously.

According to the onboard unit 10 of the present exemplary embodiment, whether or not to deploy the ramp 18 and whether or not to deploy the sliding doors 14 are determined before the vehicle V arrives at the stopping place 50. This enables an early determination as to whether or not the user P can smoothly board the vehicle at the planned vehicle boarding position at which the user P is waiting, as compared to a case in which whether or not to deploy the ramp 18 and whether or not to deploy the sliding doors 14 are determined after the vehicle V has arrived at the stopping place 50.

In a case in which the planned vehicle boarding position is not appropriate, the proposal section proposes to the user P to change the planned vehicle boarding position. This enables the user P to know that he or she cannot smoothly board the vehicle at the planned vehicle boarding position at which he or she is currently waiting, and to be able to move to a new planned vehicle boarding position before the vehicle V arrives or immediately after the vehicle V has arrived.

Moreover, according to the onboard unit 10 of the present exemplary embodiment, since the road surface information is acquired from both the camera 56 of the stopping place 50 and the terminal 60 carried by the user P, more accurate road surface information can be acquired. Further, in a case in which the user does not have the terminal 60 and is waiting for the vehicle V at the stopping place 50, the road surface information can be acquired from the camera 56 of the stopping place 50. On the other hand, even in a case in which the user P has specified the planned vehicle boarding area without a detection device, the road surface information can be acquired from the terminal 60 of the user P.

Further, according to the onboard unit 10 of the present exemplary embodiment, the notification section 210 provides notification of the recommended area to which to move that is determined by the calculation section 208. This enables the user P to know the position at which he or she can smoothly board the vehicle before the vehicle V arrives.

Supplementary Explanation of the Above
Exemplary Embodiment

Although the onboard device 10 installed at the vehicle V has been described as the vehicle information management device in the above-described exemplary embodiment, there is no limitation thereto, and the vehicle information management device may be a server that is provided outside the vehicle. In this case, the server, the onboard unit, the detection device for the planned vehicle boarding area, and the terminal of the user are connected via a network. The vehicle may be controlled by a signal transmitted from the server to the onboard unit.

Although the guard pipe 54 has been described as an example of an obstacle in the above-described exemplary embodiment, there is no limitation thereto. For example, an obstacle may be a column provided at a stopping place, or another object such as a curb, a plant, or a rock. Further, an obstacle is not limited to an object, and may be an animal or a person other than a user.

Further, although the road surface information acquisition section 200 has been described in the above-described exemplary embodiment as acquiring road surface information from the camera 56 provided at the sign post 52 at the stopping place 50 and from the terminal 60 of the user P, there is no limitation thereto. For example, road surface information may be acquired from only one of the detection device for the planned vehicle boarding area or the terminal of the user. Further, the detection device is not limited to being provided at a stopping place, and may be provided, for example, at a utility pole near the planned vehicle boarding area.

Moreover, although the road surface information acquisition section 200 has been described in the above-described exemplary embodiment as acquiring road surface information after receiving a vehicle boarding preference of the user P, there is no limitation thereto. For example, a road surface information acquisition section may acquire road surface information from a detection device of a stopping place before a street bus that stops at plural stopping places arrives at the respective stopping places. In this case, for example, a detection device at a stopping place may also detect whether or not a wheelchair user is waiting, and in a case in which a wheelchair user is present, determine whether or not to deploy a ramp and whether or not to deploy doors with respect to a planned vehicle boarding position at which the user is waiting.

Although the determination section 204 has been described in the above-described exemplary embodiment as determining the presence or absence of an obstacle that will be an obstruction to deploying the ramp and deploying the doors, respectively, there is no limitation thereto, and a determination section need not determine the presence or absence of an obstacle.

Moreover, although explanation has been given in the above-described exemplary embodiment regarding the case in which the opening 12 of the vehicle V is opened and closed by the pair of sliding doors 14, the type of door is not limited thereto, and for example, a folding door or a hinged door may be used.

What is claimed is:

1. A vehicle information management device comprising:
a processor, wherein the processor is configured to:
acquire a width of a user;
before a vehicle arrives at a planned vehicle boarding area of the user, acquire road surface information of the planned vehicle boarding area;
based on the road surface information, determine whether or not a road surface height of a planned vehicle boarding position, at which the user is waiting at the planned vehicle boarding area, is a height at which a ramp of the vehicle can be deployed;
in a case in which the road surface height is determined to not be a height at which the ramp can be deployed, propose a change of the planned vehicle boarding position to the user;
in a case in which the road surface height is determined to be a height at which the ramp can be deployed, determine whether an obstacle is present at the planned vehicle boarding position;
upon determination that an obstacle is present at the planned vehicle boarding position, determine whether a pair of doors can be opened by a width that enables the user to board the vehicle based on the width of the user;
upon determination that the pair of doors can be opened by a width that enables the user to board the vehicle, notify the user that the vehicle boarding entrance is narrow; and
after the vehicle arrives at the planned vehicle boarding area, deploy the ramp.

2. The vehicle information management device according to claim 1, wherein the processor is configured to:
based on the road surface information, determine whether or not an obstacle is present which will obstruct deployment of the ramp at the planned vehicle boarding position;
in a case in which an obstacle is not present and the road surface height is a height at which the ramp can be deployed, determine that the ramp can be deployed at the planned vehicle boarding position; and
in at least one of a case in which an obstacle is present or a case in which the road surface height is not a height at which the ramp can be deployed, determine that the ramp cannot be deployed at the planned vehicle boarding position.

3. The vehicle information management device according to claim 2, wherein the processor is configured to acquire the road surface information from a detection device provided at the planned vehicle boarding area.

4. The vehicle information management device according to claim 2, wherein the processor is configured to acquire the road surface information from a terminal carried by the user.

5. The vehicle information management device according to claim 1, wherein the processor is configured to:
in a case in which it is determined that the user has agreed to move location, determine a recommended area to which to move and notify the user of the recommended area.

* * * * *